May 31, 1966  J. M. QUINN  3,254,146
PROCESS FOR ORIENTING POLYVINYL CHLORIDE FILM
Filed April 26, 1962  3 Sheets-Sheet 1

Fig. 1
RING DIFFRACTION PATTERN SHOWING ORIENTATION EFFECTS

Fig. 2
TYPICAL DENSITOMETER TRACE TAKEN AROUND THE MAIN DIFFRACTION RING

INVENTOR
JAMES MAURICE QUINN

BY
ATTORNEY

May 31, 1966      J. M. QUINN      3,254,146

PROCESS FOR ORIENTING POLYVINYL CHLORIDE FILM

Filed April 26, 1962      3 Sheets-Sheet 3

Fig. 4

STRUCTURAL CHARACTERISTICS OF EXAMPLES AND CONTROLS

INVENTOR
JAMES MAURICE QUINN
BY Herbert M. Wolfson
ATTORNEY

United States Patent Office 3,254,146
Patented May 31, 1966

3,254,146
PROCESS FOR ORIENTING POLYVINYL
CHLORIDE FILM
James Maurice Quinn, Tonawanda, N.Y., assignor to E. I.
du Pont de Nemours and Company, Wilmington, Del.,
a corporation of Delaware
Filed Apr. 26, 1962, Ser. No. 193,039
18 Claims. (Cl. 264—210)

This application is a continuation-in-part of my co-pending applications Serial No. 155,521, filed October 24, 1961, now abandoned, and Serial No. 773,234, filed November 12, 1958, now abandoned. Application Serial No. 155,521 is a continuation-in-part of my application Serial No. 773,262, filed November 12, 1958, now abandoned. Applications Serial No. 773,262 and Serial No. 773,234 are continuation-in-part applications of my application Serial No. 658,934, filed May 14, 1957, now abandoned.

This invention relates to the manufacture of polyvinyl chloride film, particularly polyvinyl chloride film suitable for conversion to bags, containers and similar packages.

The desired properties for such polymeric films are well known. The polymer must be capable of being formed into a thin (less than 10 mils) film. As a thin film, it must be capable of being coated and being formed into a material that has strength and flexibility at both room temperature and low temperatures; is heat-sealable; is durable at the heat seal as well as durable over the complete film and, if heat-shrinkable, durable after heat shrinking; is nontoxic; is relatively moistureproof; has a low permeability to oxygen, carbon dioxide and gases in general; has a high gloss; is clear and transparent; and is sufficiently stiff to be operable in high speed packaging equipment.

There are numerous obstacles to the utilization of polyvinyl chloride films as thin packaging films. Almost all of the above desirable properties are difficult to obtain. Heretofore, a useful combination of these properties has not been achieved with any polyvinyl chloride film. The thin films produced were extremely shock-brittle displaying very poor durability. The films could withstand only the most careful handling. They failed miserably when handled in the normal manner to form a package and, if some did survive package formation, they could not be expected to withstand the handling normally encountered in using the package.

The addition of comonomers to polyvinyl chloride resins to provide a copolymer containing a major proportion of polyvinyl chloride in order to solve the durability problem encountered with unplasticized films has met with failure. Although a modest improvement in durability is sometimes obtained, it is obtained only at the expense of a lower tensile strength, a reduction in thermal stability and a decrease in softening temperature.

The addition of plasticizer to the polyvinyl chloride used in the formation of the film has also failed. The use of 5% plasticizer, and even up to 15% plasticizer, does not improve the durability of the film substantially and in fact tends to decrease the durability. The polyvinyl chloride film containing up to 15% plasticizer is therefore still substantially rigid and shock-brittle, and not capable of withstanding normal handling.

The use of more than 15% plasticizer begins to improve the polyvinyl chloride film's durability. Usually more than 30% plasticizer must be used to provide a sufficient effect on the film to make it approach usefulness as a packaging material at room temperature. This is also true of the vinyl chloride copolymer films. However, with so much plasticizer, the film is limp and, in general, displays poor handling characteristics. Like the lightly plasticized film, it is also difficult to convert into bags on automatic packaging machinery. Of even greater importance, the economical plasticizers in the quantities used in highly plasticized films impart toxicity to the film, thus limiting their use with foods.

Furthermore, the highly plasticized films, although durable at room temperature, have a distinct brittleness temperature below room temperature. The use of these films in freezers and in other low temperature food storage is, therefore, severely limited. Attempts to compromise good room temperature properties with adequate low temperature properties or to compromise room temperature durability with desired stiffness for handling by varying the amount and type of plasticizer have been unsuccessful. A polyvinyl chloride packaging film competitive with known packaging films has remained an elusive goal.

One object of the present invention, therefore, is to form a thin (less than 10 mils thick), substantially unplasticized (not more than 10% plasticizer) polyvinyl chloride film that is competitive in the packaging film industry, i.e., a film that is strong, durable, form-stable, heat-sealable, receptive to coatings, etc. at room temperature as well as low temperatures. Another object is to provide a process for preparing such films.

The processes for preparing polyvinyl chloride film have involved the fabrication of highly plasticized polyvinyl chloride resins by calendering or casting from a solution of the polyvinyl chloride resin. However, attempts to use polyvinyl chloride in a continuous process that involves the extrusion of molten resin containing little or no plasticizer in the form of a film followed by one-way or two-way elongation to orient the film have been singularly unsuccessful. A further object of the present invention, therefore, is to prepare a substantially unplasticized oriented polyvinyl chloride film that is strong, durable, etc., in a continuous manner by an economical process. Other objects will appear hereinafter.

The objects are accomplished by a process which comprises preparing a molten composition of polyvinyl chloride and 1.5 to 10%, preferably no more than 5%, by weight of a plasticizer, said composition having a glass transition temperature of at least 75° C., preferably at least 90° C.; extruding said composition in the form of a self-supporting film; cooling said film to a temperature of 80–115° C., preferably 80–95° C.; elongating the film at said temperature in at least one direction an amount necessary to provide a planar orientation number for said film of at least 16, preferably to a crystalline orientation index of at least 35 and to a thickness of less than 10 mils; and, thereafter, cooling the film to room temperature. If it is desired to heat-set the film, then it is necessary, after the elongation step, to maintain the temperature of the film at a temperature within the range of 100–165° C., preferably 150–165° C., while preventing any substantial change in the dimensions of the film, for a time sufficient to provide a crystalline orientation index for said film of at least 65, preferably at least 85, and a planar orientation number for said film of less than 16, preferably less than 10; and, thereafter, cooling the film to room temperature.

Specifically, the process comprises blending a mixture of polyvinyl chloride resin and additives comprising a heat-stabilizing agent and a lubricant, the total amount of additives being such as to produce an effect produced by 1.5 to 10% of a plasticizer for said resin; heating said mixture to a temperature above the melting point of the polyvinyl chloride resin sufficient to convert the mixture into a melt containing the polyvinyl chloride resin and a sufficient amount of said heat-stabilizing agent to prevent degradation of said polyvinyl chloride; preferably, agitating the mixture for at least one minute at said temperature above the melting point of polyvinyl chloride; extruding the melt in the form of a film while retaining a sufficient amount of said heat-stabilizing agent in said melt to prevent degradation of the polyvinyl chloride; elongating said film at a temperature of 80–115° C. in at least one direction at least 1.7 times its original dimension in that direction, preferably, elongating the film by stretching in two mutually perpendicular directions amounts to increase the area of the film by a factor of at least 2.9; and, thereafter, cooling the film to room temperature. To impart dimensional stability to the elongated polyvinyl chloride film, the film is maintained at a temperature of 100–165° C., preferably 150–165° C., after the elongation step while preventing any substantial change in the film's dimensions for a time sufficient to heat-set the film; and, thereafter, cooling the film to room temperature.

The final heat-set vinyl chloride polymer film has the following characteristics:

(1) It contains 1.5 to 10% plasticizer, preferably no more than 5%;
(2) It has a crystalline orientation index of at least 65, preferably at least 85;
(3) It has a planar orientation number of less than 16, preferably less than 10;
(4) It is preferably less than 10 mils thick; and
(5) It has preferably an orientation balance number of less than 10.

Such a film would display the following properties:

(1) A shrinkage of no more than 25%, preferably less than 10%, along the axis (axes) of orientation when exposed to a temperature of 130° C. (dry heat) for 10 minutes;
(2) A durability of at least 20 drops at 0° F.; a falling ball impact strength at 0° F. of at least about 10 kg.-cm./mil;
(3) A tensile strength of at least 9000 pounds (p.s.i.) in the direction(s) of orientation; and
(4) An elongation of at least 20% in the direction(s) of orientation.

On the other hand, the non-heat-set vinyl chloride polymer film has the following characteristics:

(1) It contains 1.5–10% plasticizer, preferably no more than 5%;
(2) It has a crystalline orientation index of at least 35, preferably at least 45;
(3) It has a planar orientation number of at least 16, preferably at least 18;
(4) It is preferably less than 10 mils thick; and
(5) It has preferably an orientation balance number of less than 10.

Such a film would display the following properties:

(1) A shrinkage of at least 15% along the axis (axes) of orientation when exposed to a temperature of 130° C. (dry heat) for 10 minutes;
(2) A durability of at least 20 drops at 0° F.;
(3) A tensile strength of at least 9000 pounds (p.s.i.) in the direction(s) of orientation; and
(4) An elongation of at least 20% in the direction(s) of orientation.

The invention will be more clearly understood by referring to the drawings during the reading of the specification.

DEFINITIONS OF MEASUREMENTS

Glass Transition Temperature is determined from the dielectric loss factor. The dielectric loss factor is measured using a film sample in accordance with ASTM Test D–150–54T using a Schering bridge capacitor and a frequency of 1000 cycles per second. These measurements are made over a suitable range of temperature by mounting the sample and electrode assembly in an air oven. The loss factor is then plotted versus the test temperature. The temperature corresponding to the maximum dielectric loss factor appearing in the resulting curve at a temperature not above 105° C. is the glass transition temperature.

Planar Orientation Number (P.O.N.) is defined as the absolute value of the average of the edge birefrigence as would be measured with the incident light impinging on one of the edges of the film parallel to the longitudinal or machine direction (direction of extrusion) and the corresponding value measured with light impinging on the film parallel to the transverse direction (perpendicular to the extrusion direction) of the film multiplied by $10^{+4}$.

Crystalline Orientation Index (C.O.I.) is defined as the X-ray crystallinity parameter divided by the average of the X-ray orientation angles measured with the incident radiation impinging on the film along the longitudinal and transverse directions of the film, multiplied by 100.

Orientation Balance Number (O.B.N.) is defined as the absolute value of the birefringence of the film wherein the incident beam of light is directed at the film perpendicular to the major plane of the film multiplied by $10^{+4}$.

Edge Birefringence is defined as the difference between the refractive index along a direction lying in the major plane of the film and the refractive index along a direction perpendicular to the plane of the film, being considered positive when the former index is greater than the latter. The birefringence is measured according to a method essentially identical to one which has been described in the literature (R. S. Stein, Journal of Polymer Science 24, 383–386 (1957)). Thin method involves measurement of the optical retardation of film samples which are tilted with respect to the incident beam of polarized light. The values of the edge birefringence are calculated from these measurements, the optical retardation measured with the beam directed perpendicularly against the film sample, and the sample thickness. A stack consisting of several layers of film all oriented the same way with respect to the stretch axes of the film and totalling at least 8 mils in thickness is used as the sample, in order to increase the accuracy of the measurements. The average refractive index of the film is taken as 1.52.

X-ray Orientation Angle (O.A.) is an indication of the degree of alignment of the polymer chains in the crystalline portion of the sample in a direction parallel to the major plane of the film specimen. It is obtained from an examination of the wide angle diffraction pattern.

The wide angle diffraction pattern is obtained as follows. The diffraction sample is mounted in a flat plate camera having a sample to photographic film distance of 10 centimeters. A beam of zirconium-filtered molybdenum K-alpha radiation is directed through the center of the diffraction specimen and perpendicular to the plane of the recording photographic film. Using the model XRD–5 X-ray diffraction apparatus, manufactured by the General Electric Company, the X-ray tube is operated at 20 milliamps and 50 kilovolts, and the X-ray beam is collimated by passage through two successive pin holes of diameter 0.020 inch, which are spaced 6″ apart in the collimator. The photographic film used is known as Ilford "Industrial G" X-ray film. Excessive blackening of the photographic film due to the undiffracted portion of the incident beam is prevented by the use of a flattened circular lead beam stop 0.6 millimeter in diameter which is mounted adjacent to said film, being positioned at the center of the diffraction pattern so as to intercept the undiffracted beam. The exposure time is adjusted so that the maximum optical density of the photographic image on the negative resulting after development according to conventional procedures is between 0.5 and 0.6. With the sample thicknesses and conditions specified herein, the exposures used were 20 hours in duration.

When the diffraction pattern is obtained with the incident beam perpendicular to the plane of the film diffraction specimen (herein described as "perpendicular" exposures), the film diffraction specimen is prepared by stacking successive layers of the film, all having the same orientation relative to one another with respect to the stretch axes of the film, to a thickness of 0.050 inch. This film diffraction specimen is then mounted in the camera in a manner such that the plane of the film layers is perpendicular to the diffraction beam. For a biaxially stretched film, which has been stretched to substantially the same extent in two mutually perpendicular directions, no orientation effects are detectable in an X-ray diffraction pattern taken with the X-ray beam directed perpendicular to the plane of the film. This indicates that the crystalline areas are randomly oriented within the plane of the film.

When the diffraction pattern is obtained with the beam parallel to the plane of the film diffraction specimen (herein described as "edgewise" exposures), the strip of film is first cut parallel to one of the axes of stretch, then this is folded upon itself in a zigzag fashion in such a manner that a relatively thick edge (greater than the diameter of the incident X-ray beam) is provided. This sample is then mounted in an X-ray apparatus so that the beam passes parallel to the major plane of the film and one edge of the film, but perpendicular to the other film edge. The width of said strip of film in the direction of the incident beam is 0.050 inch. For a biaxially stretched film, which has been stretched to substantially the same extent in two mutually perpendicular directions, distinct orientation effects can be seen. The continuous circular diffraction rings obtained with the beam perpendicular to the plane of the film are now broken into discontinuous arcs, which tend to subtend smaller angles as the crystalline orientation is increased.

Figure 1:
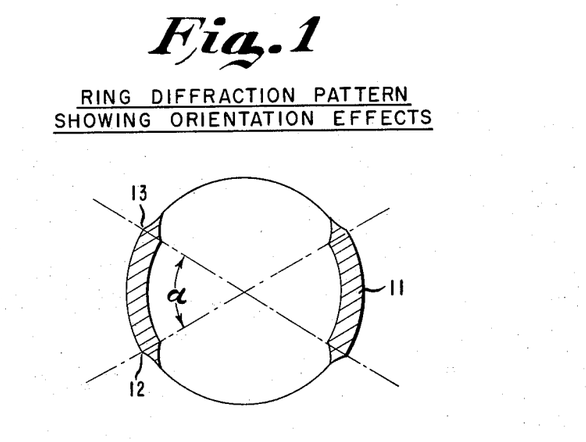
FIGURE 1 illustrates a ring diffraction pattern wherein 11 represents the concentrated arcs and α represents the orientation angle, discussed more fully in connection with the measurement of crystalline orientation index and X-ray orientation angle.
Figure 2:
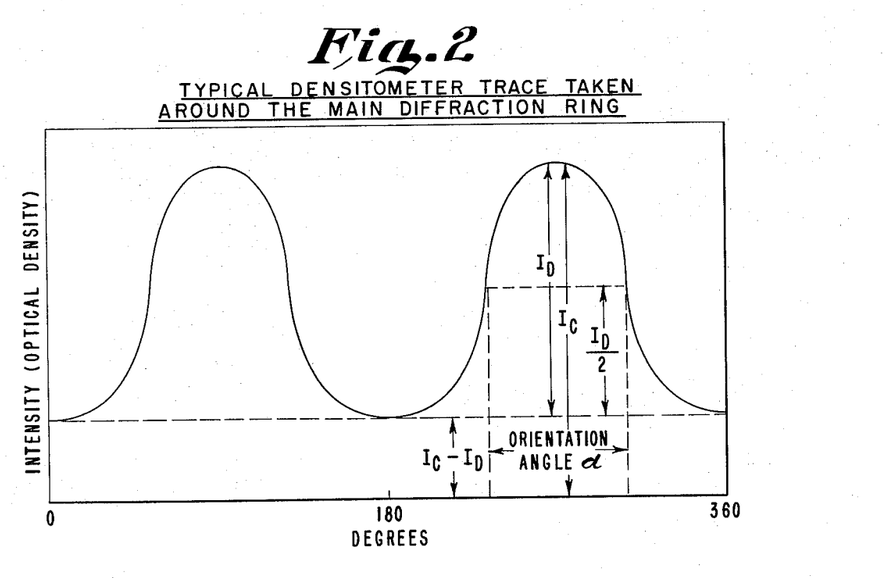
FIGURE 2 represents a densitometer trace around the diffraction ring shown in FIGURE 1, intensity (Optical Density) is plotted versus degrees. $I_C$ represents total recorded intensity and $I_D$, intensity of diffraction peak.

A quantitative measure of the degree of orientation of the crystalline segments is obtained by determining essentially the length of one of the arcs on the X-ray diffraction pattern. This is done by making a circular densitometer trace around the ring diffraction pattern using the principal reflection, which occurs at a value of twice the Bragg angle ($2\theta$) of approximately 8 degrees with molybdenum K-alpha radiation. The appearance of a ring diffraction pattern showing orientation effects is shown schematically in FIGURE 1. A densitometer trace around the ring gives the type of pattern shown in FIGURE 2. The Orientation Angle is defined as the width of the peak at half the maximum diffracted intensity, as shown in FIGURE 1. This width is measured in terms of the number of degrees in the central angle which subtends the arc at points 12 and 13 indicated in FIGURE 1. Thus, a high degree of planar orientation is indicated by relatively low orientation angles, with the beam directed against each of two mutually perpendicular edges of the film, herein taken as parallel to the longitudinal and transverse directions of said film, and an orientation angle of 180 degrees in each of the two edge directions indicates no planar crystalline orientation in the film sample.

The X-ray-Crystallinity Parameter (X.C.P.) is determined by using the wide angle spectrogoniometer pattern. The wide angle spectrogoniometer X-ray diffraction pattern is obtained by using a local intensity direct recording measuring receiver rather than a photographic film to record the diffracted rays. The method involves irradiation of a specimen with essentially monochromatic X-rays while measuring the intensity of the diffracted radiation at various Bragg scattering angles by moving the intensity measuring receiver through the cone of diffracted radiation while recording the intensity of the irradiation as a function of the Bragg angle. A highly quantitative record can be obtained by this method. In this work the General Electric Model SPG Spectrogoniometer is used in conjunction with the model XRD–5 X-ray diffraction apparatus, also manufactured by the General Electric Company. This instrument uses a Geiger-Muller counter to record the diffracted intensity and uses parafocusing geometry in order to obtain a strong signal. The general technique is described, for example, in Klug and Alexander, "X-Ray Diffraction Procedures," Wiley, New York, 1954, p. 235 ff.

With this instrument, a flat sample such as a polymeric film is mounted against a suitable sample holder. The incident radiation is directed against the surface of this film sample in a direction which is substantially tangential to the surface of the film sample at low Bragg angles. The diffracted radiation is detected by the Geiger-Muller counter, which rotates through successively larger scattering angles during the course of the measurement. In order to satisfy the conditions for the parafocusing principle, it is necessary that the sample mount also rotate but at an angular rate one-half that of the detector. The intensity of the diffracted beam is amplified and plotted on a strip chart recorder as a function of the Bragg angle. The appearance of this trace is that of a series of peaks occurring at various Bragg angles, said peaks corresponding to the various circular rings or halos seen on a flat plate X-ray diagram.

In this work, zirconium-filtered molybdenum K-alpha radiation was used, together with a krypton-filled Geiger-Muller counter. The X-ray tube was operated at 20 milliamps and 50 kilovolts, and the X-ray beam was collimated by passage through a 1° slit before striking the sample. The sample was scanned, in a direction of increasing Bragg angle, at a rate of 2 degrees per minute, using a medium range Soller slit with a detector slit of 0.2 degree, and a recorder time constant of 4 seconds. Measurements made with typical film samples mounted at various orientations with respect to the stretch axes of the film and the direction of the incident radiation showed that the pattern obtained was substantially independent of the sample mounting, even with films appearing quite highly unbalanced in flat plate X-ray photos. However, for consistency, throughout the work in which the spectrogoniometer pattern was used in measuring the percent crystallinity, the film samples were mounted with the longitudinal or machine direction parallel to the direction of the incident beam. It was found that with films of polyvinyl chloride the recorded signal was independent of sample thickness so long as the thickness was greater than about one mil. For this reason, only a single thickness of film was necessary as the sample.

Figure 3:
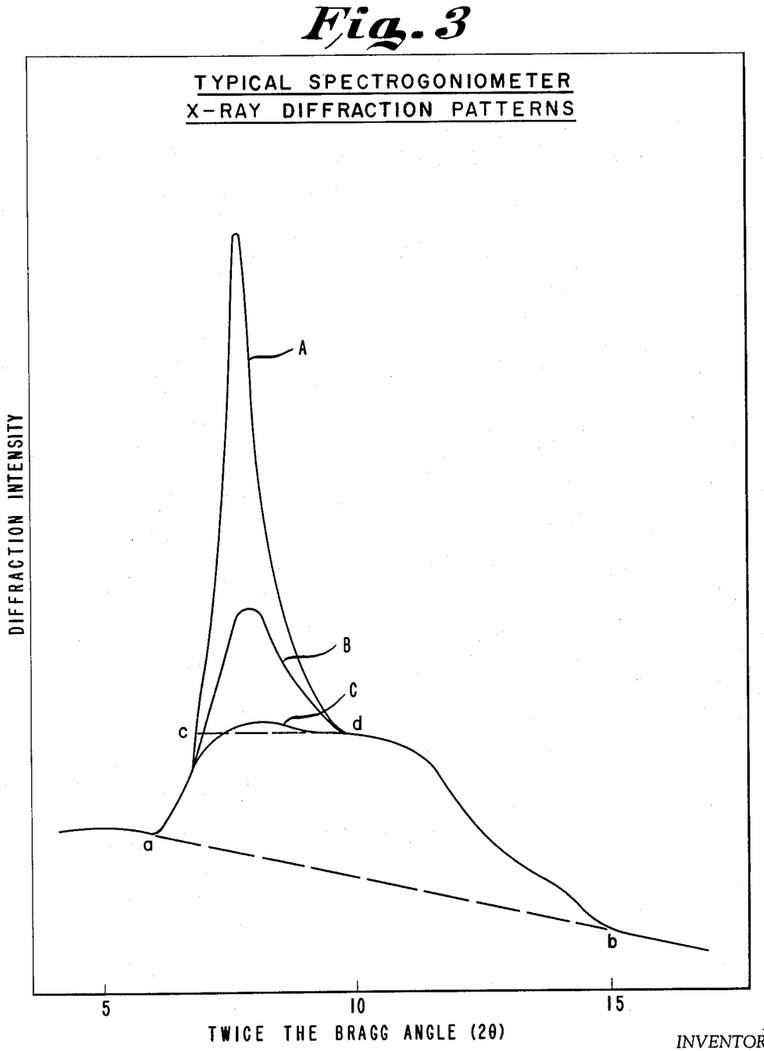
FIGURE 3 illustrates three spectrogoniometer X-ray diffraction patterns used in measuring the X-ray crystallinity parameter, which in turn is used in calculating the crystalline orientation index, Diffraction Intensity is plotted versus twice the Bragg angle, curve A representing a pattern showing a high level of crystallinity, curve B representing a pattern showing a relatively low level of crystallinity and curve C representing a pattern showing no crystallinity.

As illustrated in FIGURE 3, the diffraction pattern of oriented polyvinyl chloride films is typified by the appearance of a relatively sharp peak of variable intensity occurring at a value of twice the Bragg angle ($2\theta$) of approximately 8 degrees (using molybdenum K-alpha radiation) superimposed on a much broader peak of more nearly constant apparent intensity centered at approximately 9 to 10 degrees. The entire region covered by these peaks extends from about 6 degrees to about 15 degrees. The sharp peak centered at about 8 degrees is due to the crystalline portion of the material while the broad peak centered at about 10 degrees is due chiefly to the amorphous portion.

The X-Ray Crystallinity Parameter is measured by the following procedure. A base line denoted by *ab* on FIGURE 3 is drawn connecting the flat portions of the diffraction pattern at either side of the diffraction peaks. A horizontal line is then drawn at the base of the sharp crystalline peak centered at 8 degrees so as to intercept the contour of the over-all curve at point *d*, which is the inflection point occurring at approximately 10 degrees and which corresponds to the base of the sharp peak centered at approximately 8 degrees. The X-ray crystallinity parameter is then defined as the ratio of the area under the total curve but above the line *cd* (i.e., the area of the crystalline peak) to the total area under the curve and above the line *ab* (i.e., the sum of the areas of the two peaks). This ratio corresponds essentially to the ratio of the crystalline diffraction to the sum of amorphous diffraction plus the crystalline diffraction and is therefore a measure of the crystallinity of the polymer.

Tensile Strength (T.S.), Elongation (El.) and Initial Tensile Modulus (I.T.M.) are normally measured at 23.5° C. and 50% relative humidity, although they may also be measured at other specified temperatures and humidities. They are determined by elongating the film sample in an Instron tensile tester at a rate of 100% per minute until the sample breaks. The force applied at the break in p.s.i. is the tensile strength. The elongation is the percent increase in the length of the sample at breakage. Initial tensile modulus in p.s.i. is directly related to the film stiffness. It is obtained from the slope of the stress-strain curve at an elongation of 1%. Both tensile strength and initial tensile modulus are based upon the initial cross-sectional area of the sample.

Pneumatic Impact Strength (P.I.S.) is the energy required to rupture a film. It is reported in kilograms-centimeters per mil thickness of the sample. The pneumatic impact strength is determined by measuring the velocity of a ball mechanically accelerated by air pressure, first in free flight and then in a flight impeded by rupturing the test sample. In this test, the film sample is 1¾" x 1¾". The projectiles are steel balls ½" in diameter and weighing 8.3 grams. The free flight velocity is 23 meters per second. The velocities are measured by timing photoelectrically the passage of the steel balls between two light beams set a definite distance apart. The pneumatic impact strength is measured by the loss in kinetic energy due to the rupturing of the test sample. It is calculated from the following formula: Constant ×(Square of velocity in free flight−square of velocity in impeded flight) where the constant is directly proportional to the weight of the projectile and inversely proportional to the acceleration due to gravity. This test is carried out at 23° C. and 50% relative humidity and the test samples are conditioned for 24 hours at 23° C. and 50% relative humidity.

Tear Strength (Tr.S.) is measured on an Elmendorf tear tester. A film is cut to form sample strips of 2.5" x 5.0" each. Ten such strips from each direction, i.e., ten having the longer dimension running in the machine or longitudinal direction or the direction in which the film was extruded, cast or calendered, and ten having the longer dimension running in a direction transverse to the machine direction, are conditioned and tested at 75° F. and 35% relative humidity. The tester consists of a stationary jaw and a movable jaw mounted on a pendulum swinging on a substantially frictionless bearing and equipped with a means for measuring the maximum arc through which the pendulum will swing. After the sample has been clamped in the tester, an initial cut of 0.81" running in the intended direction of the subsequent tear is made by means of a blade mounted on the tester. The force required to extend the initial tear is measured by determining the work done in tearing the film through a given distance which is 1.69". The work is determined from the difference in the swing of a pendulum, first free and then impeded by tearing the film. Auxiliary weights may be added to the pendulum when the tear strength of a single sheet of film exceeds the capacity of the pendulum alone. The scale of the Elmendorf tester, a standard instrument of the paper industry, reads in terms of grams/1.69" of tear/16 sheets. Since ten sheets are used in the present test, the values obtained from the tester must be corrected and are then converted to grams/1.69" of tear/mil of thickness.

Moisture Permeability or Initial Permeability Value (I.P.V.) is determined by placing the film over the top of an aluminum cup containing 15 milliliters of water, the test area being 33.3 square centimeters. The assembly is weighed accurately and then placed in a dry (less than 3% relative humidity) air-swept oven at 39.5° C. for 48 hours. The assembly is removed from the oven, cooled to room temperature and reweighed. The weight loss is converted to grams of water lost/100 square meters/hour. The values given in the examples are the grams of water lost/100 square meters/hour for the second 24 hour period.

Film Durability (F.D.), or rice bag drop durability, is an actual measure of the durability upon being subjected to the shock encountered when a filled package is dropped from a height. The sample is prepared by folding over a 4½" x 12" piece of film and sealing it along two sides with a 1" strip of a pressure-sensitive polyethylene terephthalate film tape or by taking two pieces of 4½" x 6" film and sealing them together on three sides with tape to make an envelope. This provides a 4½" x 6" envelope which is then filled with 400 grams of rice. The envelope is then sealed at the top with the pressure-sensitive tape, leaving a small but uniform amount of free space above the rice. Normally, for well-balanced films the longest dimension of the piece of 4½" x 12" (or 4½" x 6") film runs in the direction in which the film has been extruded, i.e., the longitudinal direction. In testing the bag this lengthwise direction of the film is perpendicular to the plane upon which the bag is dropped. For unbalanced films, only half the measurements are made with bags made as described, with the other half made with bags having the longitudinal direction at right angles to the longest dimension of the film. The test consists of dropping the bag onto a stone-topped laboratory table from a fixed height of 40" above the table, i.e., 40" from the bottom of the bag to the table top. The bags are allowed to drop onto a shorter edge of the bag. The number of falls or drops *survived* before the loss of rice from film failure is recorded; and tests in which the loss of rice resulted from failure of the pressure-sensitive tape are invalidated. Generally, at least five bags are tested for each film candidate, and the average taken. Film durabilities are measured at room temperature and at 0° F. Before carrying out the test, the film is conditioned in a constant temperature room at room temperature or 0° F. and 15% relative humidity for one day.

Falling Ball Impact Strength (F.I.S.) reflects the film's durability and is a measure of the energy required to rupture a film. It is reported in kilograms-centimeters per mil thickness of the sample. This test is carried out following the procedure described by D. W. Flierl, Modern Packaging 25 129 (1951). The films are conditioned at 0° F. for one day prior to testing.

Shrinkage (Sh.) is a measure of the form-stability of the film. Ten sample strips 10" x 10" each from each direction (as in the Tear Strength test) are supported from two adjacent corners and suspended in a circulating air oven for 10 minutes at 130° C. The dimensional change is then noted, and percent shrinkage is calculated based on the original dimension. An expansion of the material is reported as a negative percent shrinkage and is prefixed with a minus sign.

Inherent Viscosity, a relative measure of molecular weight, is measured by first preparing a solution of 0.250 gram polyvinyl chloride in 50 mls. of vacuum distilled tetrahydrofuran. Using an Ostwald-Fenske viscometer, Series 75, the efflux time for the solution, $t_s$, is measured at 30° C. An equal volume of pure solvent is then run through the viscometer using the same procedure to obtain $t_o$, the solvent time. The quotient of solution time divided by solvent time ($t_s/t_o$) is defined as the relative viscosity. The inherent viscosity is defined as being equal to the natural logarithm of the relative viscosity divided by the solution concentration expressed in grams/100 ml.

PREFERRED CONDITIONS AND EQUIVALENTS

As the polyvinyl chloride resin for use in preparing the film, any commercial polyvinyl chloride resin having film or fiber-forming characteristics can be used. Such resins are characterized by an inherent viscosity, defined previously, of at least 0.4 and preferably above 0.6. The following resins have been used according to the present invention to form the film which, when tested, fulfilled the specification of the film of the present invention:

"Gobinyle" C-1, KW-62, manufactured by St. Gobain of France; Diamond 25, manufactured by Diamond Alkali Co.; "Marvinol" VR 10, manufactured by Naugatuck Chemical Co.; "Geon" #404 HI, manufactured by B. F. Goodrich Co.; Dow #111-4, manufactured by Dow Chemical Co.; "Vipla" (KO, KM, KMO), manufactured by Montecatini of Italy; "Solvic" (S-121, 136), manufactured by Solvic SA of Belgium.

In general, the difficulty of extruding polyvinyl chloride compositions will increase as the inherent viscosity of the polymer increases. The most important criterion for melt extrudability is the polymer melt viscosity. By the use of extrusion aids such as fugitive plasticizers, it is found to be possible to extrude even the highest inherent viscosity resins by depressing the melt viscosity. For example, xylene or tetrahydrofuran may be added to the compositions prior to extrusion. Because of the relatively low boiling point of these materials they are readily removed from the film before the subsequent processing and are not present in the final films.

As plasticizers for use in the present invention, the examples illustrate the use of epoxy soybean oil. However, any of the known plasticizers for polyvinyl chloride resins may be used. These include the following so-called "primary plasticizers" such as dioctyl phthalate, tricresyl phosphate, di(2-ethyl-hexyl) adipate, di(2-ethyl-hexyl) phthalate, triphenyl phosphate, and the following so-called "secondary plasticizers" which are less efficient but suitable for use, such as the glycidyl ester of an epoxydized fatty acid (Diepoxy Ester No. 1 manufactured by Archer-Daniels-Midland Company), "Santicizer B-16" (butyl phthallyl butyl glycolate) manufactured by Monsanto Chemical Company, and other polymeric, polyester or resinous plasticizers.

It has also been found necessary to include a lubricant and heat-stabilizer in the original melt prior to extrusion. As lubricants, the following list, although by no means complete, can be satisfactorily employed in the present invention: "Lubricin" V-3 (a modified castor oil derivative), calcium stearate, stearic acid, and fatty acid amides such as oleamide. As heat-stabilizers, the following list, although by no means complete, can be used in the invention: dibutyl tin thioesters, dibutyl tin maleate and laurate dioctyl tin derivatives, aluminum, calcium and zinc salts of an organic acid mixed with a polyhydroxy compound, and various members of the terpene family, particularly those containing exomethylene groups, such as beta-pinene and beta-caryophyllene, either singly, as claimed in my co-pending application Serial No. 710,871, now abandoned or in combination with various organometallic compounds as claimed in co-pending application Serial No. 754,941, now abandoned. The heat-stabilizers serve to prevent degradation of the polyvinyl chloride at temperatures above the melting point of the polymer by, it is believed, reducing the loss of halogen acid from the polymer.

For the purpose of the present invention it is necessary that not more than 10% and preferably no more than 5% of a primary plasticizer or its equivalent as determined by the method described below be present in the ultimate film. Besides the economy and toxicity considerations discussed previously, it has been discovered that film containing more than about 10% of a primary plasticizer cannot be converted to a film having the structure of the present invention and having suitable high temperature dimensional stability or low temperature durability. The use of excessive plasticizer also results in a noticeable softening of the film at room temperature, thus greatly decreasing the utility of the film in high speed packaging equipment. It is found that the addition of excess plasticizer to the polyvinyl chloride compositions tends to decrease the inherent ability of the compositions to form the desired oriented crystalline structure characterized by high crystalline orientation index. Within the preferred range of plasticizer content, this tendency can be overcome or suitably controlled by lowering the temperature of heat treatment, but when excess plasticizer is used it becomes impossible to do this, and a film having the desired structure cannot be prepared.

It has been found useful to add various ingredients such as those discussed above in order to facilitate the extrusion of polymeric materials. These additives may include, for example, thermal stabilizers, lubricants, slip agents, latent solvents and the like. Although not true plasticizers, these additives give some incidental plasticizing action, the effect being approximately one-half the plasticizing effect produced by a primary plasticizer. The actual effectiveness of a given amount of a particular additive as a plasticizer will depend upon many factors such as its chemical and physical nature, molecular weight, boiling point, and the compatibility of the additive with the polymer. The important requirement in the compositions used in the process of this invention is that the total effect of all of these various additives does not exceed that which is equivalent in total effect to the effect of the inclusion of up to 10%, and preferably not more than 5%, of a good primary plasticizer for polyvinyl chloride, such as dioctyl phthalate or tricresyl phosphate, as determined by the effect of the additives on the glass transition temperature of the polymer.

It has been found that the capability of various additive-containing polyvinyl chloride compositions for forming the oriented crystalline structure characteristic of the films of this invention may be related to and defined in terms of the glass transition temperature of the polymer composition. This is preferably measured on the film prior to stretching, but when the composition remains essentially constant during processing, can optionally be measured on the film after the subsequent steps of stretching or stretching and heat treatment. The term "glass transition" refers to a temperature or temperature range within which the properties of a polymer change from those of a relatively hard, brittle, glassy material to those of a softer, more flexible rubbery substance as the temperature is raised. It is found that the effective glass transition temperature of polyvinyl chloride compositions must be at least 75° C. corresponding to a maximum of 10% plasticizer and preferably greater than 90° C. corresponding to no more than 5% plasticizer in order to obtain the films of this invention. The upper limit is the glass transition temperature of the pure homopolymer, 105° C.

In addition to homopolymer polyvinyl chloride resins, copolymers of vinyl chloride containing minor amounts of other polymerizable monomers such as vinyl acetate, vinylidene chloride, acrylonitrile and the like may be used in the compositions of this invention. It is found, however, that the addition of such comonomers tends to restrict somewhat the maximum obtainable crystalline orientation index, and therefore it is necessary that the amount of such comonomer not exceed about 15 mole percent of the total polymer, calculated from the corresponding monomers. Where copolymers containing such minor amounts of other polymerizable monomers are used in the compositions of the invention, it is found that the glass transition temperature also tends to be lower than if homopolymer resins are used. The permissible limits of additives which may be used in this case may also be determined by measuring the glass transition temperature as discussed above. In general, it is found that as increasing amounts of other polymerizable monomers are incorporated in the copolymer resin the permissible upper limit of plasticizing additives tends to decrease.

Controlling the amount of plasticizer or plasticizing additives in the ultimate film is most easily accomplished by limiting the amount of such additives in the original melt prior to extrusion. However, as suggested above, it is also possible to use greater quantities than the preferred limit of 5% of a good plasticizer or its equivalent for example, which excess may be removed or lost at a later stage of the process. The most desirable amount of plasticizer left in the film is as close to zero as possible. However, from a practical standpoint a minimum amount of 0.4% has been found operable.

As has been discussed in the foregoing, it is necessary that the initial film be prepared by a process of melt extrusion. In order to insure the structural benefits of the extrusion process, it is preferred that the polymer be held above its melting temperature of about 180° C. for an appreciable period of time, for example, more than one minute, prior to extrusion, and that during this time the film be subjected to thorough mixing, as by the conventional extrusion screw.

The elongating step which is critical to the process of the present invention may be carried out in any of several ways. The polyvinyl chloride film may be first rolled in one direction and then stretched in the direction perpendicular to the direction of rolling; or it may be stretched first and rolled afterward in the direction perpendicular to the direction of stretching; or it may stretched at least in one direction; or it may be simultaneously stretched in each of two mutually perpendicular directions; or it may be first stretched in one or two directions and subsequently stretched to a further extent in one direction. Another method to effect orientation comprises extruding the polymer into the form of a tubular film, and then elongating the film by inflating the tube while it is within the specified temperature range for orientation, for example, by the method claimed in copending application Serial No. 665,053, now U.S. Patent 2,987,767. To derive the greatest benefits from the orientation step, the temperature of the film should be within the range of 80–95° C. and the area should be increased by stretching by a factor of at least 2.9 (1.7× in each of two directions). Orientation by stretching appears to be preferred over orientation by rolling. The actual degree of stretching required to obtain the planar orientation number required in the stretched film will depend upon the temperature of stretching and to some extent the composition of the film. It is found, however, that operating within the preferred range of composition and temperature that the optimum elongation range is from 1.8× to 3× in both directions, although elongation may be carried out to as much as 4× in both directions. The important requirement is that the planar orientation number of the stretched film be at least equal to 16.

The heat treatment step of the present invention is critical for imparting form-stability to the oriented polyvinyl chloride film, i.e., obtaining a film having a minimum tendency to shrink at heat-sealing temperatures. The time required for the desired structural conversion during the heat treatment will depend on a number of factors, such as the planar orientation number of the stretched film, the relation of the heat treatment temperature to the effective melting temperature of the polymer composition, and the desired crystalline orientation index of the final film. For films having a given planar orientation number and a given composition, it is found that in general there is an inverse relationship between the time required for the structural conversion and the temperature of the film. It is, however, not true to say that there is an exact equivalence of these two variables. Although the conversion can be carried out if sufficient time is allowed at temperatures between about 100° C. and 170° C., it is found that as the temperature is lowered below about 150° C. the required time suddenly becomes impractically long for a commercial process. Below 100° C. the conversion will not take place in any reasonable length of time while above about 170° C. there is a melting of the crystalline orientation preventing the desired structural conversion from occurring. Within the preferred range of 150°–165° C. it is found that not only does the desired structural conversion occur but that the required time is sufficiently short, i.e., less than 1–5 minutes, to be commercially feasible. In fact, times as little as a fraction of a second may be used depending upon the desired degree of the conversion.

The time necessary to attain the desired film temperature will depend upon the efficiency of the heating method and the temperature of the heating medium. In most of the subsequent examples a maximum time of exposure within the preferred range was permitted to be certain that the film attained a temperature in this range. However, the exposure to 150°–165° C. can be decreased to as low as one second in more efficient continuous apparatus in order to raise the temperature of the film to the required temperature. In fact, the exposure required to attain 150°–165° C. temperature in the film may be reduced to a fraction of a second by merely increasing the temperature of the heating medium. In such cases, careful control of the time of heating must be employed, in order to avoid excessive heating of the film and loss of the film properties due to melting of the oriented crystalline portions.

The maximum practical times of heat treatment are frequently governed in part by the relationship between the surface quality of the film, the heat treatment temperature, and the resulting inherent mechanical properties of the oriented films. It is found that at almost any heat treatment temperature all oriented un-heat treated polyvinyl chloride films held under tension will eventually tend to rupture due to internal stress. Since as mentioned above the time for the structural conversion becomes very long at temperatures below 150° C., there is increased opportunity for film rupture to occur before completion of this desired conversion at such relatively low temperatures. Since film rupture tends to initiate at thin spots or at any particles embedded within the film, in many cases the quality or uniformity of the film tends to determine the maximum attainable treatment time. Melt extrusion can be used to directly provide films of excellent surface quality and internal uniformity. Since calendered films tend to show internal inhomogeneity, the described process of heat treatment is uniquely suited to extruded film which must be utilized in this invention.

The invention will be more clearly understood by referring to the descriptive material and the examples which follow. It should be understood that the examples, although illustrating specific embodiments of the present invention, are not limitative thereof.

*Example 1*

This example illustrates the best mode contemplated for performing the invention. Briefly, the procedure involves melt-extruding a polyvinyl chloride composition into film form, orienting the film by stretching it in two mutually perpendicular directions and cooling the film to a temperature below 70° C. before releasing tension. Optionally, the film may be heat-set at an elevated temperature before the cooling step. All parts are by weight unless otherwise specified.

The polymer extruded was composed of a uniform blend of the following ingredients:

| | Parts |
|---|---|
| Polyvinyl chloride [1] | 92.5 |
| A mercapto tin compound [2] as a thermal stabilizer | 3.5 |
| An epoxy soy bean oil [3] as a light stabilizer and plasticizer | 3 |
| Calcium stearate | 1 |

[1] "Gobinyle" C-1, KW-62, manufactured by St. Gobain of France.
[2] "Thermolite" 31, manufactured by the Metal & Thermite Corp.
[3] "Paraplex" G-62, manufactured by Rohm & Haas Co.

The composition having a glass transition temperature of 92° C. was extruded at a temperature of 202° C. from a slot-shaped extrusion die 12¼" in width to form a film 10 mils in thickness. The lips of the extrusion die were maintained within 1 inch above the surface of a water bath into which the film was extruded. The water bath was maintained at a temperature between 2° C. and 5° C.

The film was conducted out of the water bath into the nip of a set of squeeze rolls which removed excessive surface water. The film was then conducted into a nip roll stretching apparatus for stretching the film in its longitudinal direction. The nip roll stretching apparatus was composed of two sets of pinch or nip rolls. The clearance between each pair was set so as to pinch the film as the film passed through. The first set of nip rolls was heated to a temperature of 92° C. and the rolls were rotated at a linear speed of 20 feet/minute. The second set of nip rolls was cooled to a temperature below room temperature by circulating cold water through them. The second set was rotated at a rate of 50 feet/minute. By virtue of the ratio of the speed of the fast rolls to the speed of the slow rolls, the film was stretched 2.5× in the longitudinal direction.

After being stretched in the longitudinal direction, the film was continuously fed into a tentering apparatus composed of two moving endless chains containing clips for grasping both edges of the continuously moving film. During the first part of the transverse stretch the original film width was maintained until the film was heated to about 95° C. Thereafter, the continuously moving clips diverged to stretch the film about 2.5× in the transverse direction at a surrounding temperature of 90°–92° C. Film C was then permitted to cool to 70° C. before the tension was released. The thickness of the film after stretching was 1.5 mils. Its glass transition temperature remained above 90° C.

Film D was prepared by subjecting a sample of Film C to a temperature of 155° C. for 3 minutes while the stretched dimensions of the film were maintained. (The film was not permitted to shrink during this heat-setting step.) The film was then permitted to cool to 80° C. before the tension was released.

In Table 1 the physical properties and the structural characteristics of the resulting film are compared to the properties of two control films, the latter two not being within the scope of the present invention. Control A represents the unstretched, non-heat-set film. The thickness of this film was 10 mils. Control B represents an unstretched, non-heat-set film which as 1.5 mils thick. Film C represents the film that was stretched in two directions in the manner described and Film D, stretched in two directions and, thereafter, heat-set.

The details of the methods for measuring the properties of the films and the abbreviations of these properties as used in the tables are presented in columns 3–8.

TABLE 1.—PHYSICAL PROPERTIES AND STRUCTURAL CHARACTERISTICS OF FILMS C AND D COMPARED TO TWO CONTROLS

| Properties | Film D | Controls A | Controls B | Film C |
|---|---|---|---|---|
| Machine Direction: | | | | |
| T.S | 9,900 | 6,200 | 7,580 | 11,300 |
| El | 60 | 80 | 165 | 91 |
| I.T.M | 451,000 | 333,000 | 386,200 | 310,600 |
| Tr. S | 20 | 61 | 24 | 10 |
| Sh | 6 | 3.5 | 14 | 54 |
| O.A | 27 | 180 | 180 | 32 |
| Transverse Direction: | | | | |
| T.S | 14,700 | 5,900 | 5,710 | 17,500 |
| El | 44 | 190 | 54 | 41 |
| I.T.M | 546,000 | 317,000 | 384,200 | 390,600 |
| Tr. S | 20 | 63 | 96 | 13 |
| Sh | 9 | 1 | [1] −0.4 | 51 |
| O.A | 34 | 180 | 180 | 48 |
| Independent of Direction: | | | | |
| P.I.S | 5.06 | 0.73 | 0.36 | 4.17 |
| F.D. (at room temp.) | 83 | | 4 | 70 |
| F.D. (at 0° F.) | 40 | | 0 | 38 |
| I.P.V | 90 | 190 | 210 | 116 |
| X.C.P | 49 | 0 | 0 | 30 |
| C.O.I | 161 | 0 | 0 | 75 |
| P.O.N | 9.5 | 1.0 | 0.8 | 20.2 |
| O.B.N | 4.7 | 0.5 | 0.8 | 9.2 |

[1] The minus sign indicates an increase in the dimension.

*Example II*

A polyvinyl chloride composition similar to Example I was melt-extruded under substantially the same conditions of Example I into a film 4½–5 mils in thickness, and the film was stretched 2× in the longitudinal direction and 2.17× in the transverse direction at a temperature of about 90°–95° C. Thereafter, the film was heat-set at 150° C. while the film dimensions were maintained constant for 3 minutes.

In Table 2 the properties and structural characteristics of the resulting film, Film A, are compared to the properties of Film B which was stretched but was not heat-set.

*Example III*

This example illustrates the deleterious effect of attempting to heat-set two-way stretched polyvinyl chloride films of this invention at excessively high temperatures, i.e., in excess of about 165° C. Above this temperature, most of the important physical properties of the film are degraded. This is shown in Table 3 which gives the physical properties for two-way stretched films, heat-set at 150°, 160° and 170° C.

A polyvinyl chloride composition similar to that in Example I was extruded into a film about 6–7 mils in thickness and stretched 2.5× in both the longitudinal and transverse directions. Samples of this film were heat-set under tension for two minutes at different temperatures, i.e., 150°, 160°, and 170° C. The films were placed in a tenter frame in order to maintain tension in both directions during the heat-setting step.

In Table 3, the film heat-set at 170° C. shows excessive degradation of its physical properties, particularly impact strength, reflecting the brittle character of the film.

*Example IV*

A length of the two-way stretched, heat-set film of Example I was coated with a nitrocellulose coating of a type normally applied to regenerated cellulose film. This coated film of oriented, heat-set polyvinyl chloride was then heat-sealed to itself by using a hot sealing bar (4" long and ⅛" wide) having a surface covering of glass fabric coated with polytetrafluoroethylene. The temperature of the bar was 130° C. and the seal was made at a 2 second dwell under a bar pressure of 20 p.s.i. The heat-seal strength was satisfactory for bag fabrication and the heat seals were smooth and free of puckers.

TABLE 2.—PHYSICAL PROPERTIES AND STRUCTURAL CHARACTERISTICS OF FILMS A AND B OF EXAMPLE II

| Properties | Film A | Film B |
|---|---|---|
| Machine Direction: | | |
| T.S. | 12,300 | 10,300 |
| El. | 62 | 56 |
| I.T.M. | 489,000 | 428,000 |
| Tr. S. | 13 | 17 |
| Sh. | 6 | 45 |
| O.A. | 33 | 47 |
| Transverse Direction: | | |
| T.S. | 10,400 | 12,400 |
| El. | 65 | 41 |
| I.T.M. | 440,000 | 457,000 |
| Tr. S. | 27 | 21 |
| Sh. | 6 | 50 |
| O.A. | 32 | 55 |
| Independent of Direction: | | |
| P.I.S. | 5.05 | 3.77 |
| F.D. (at room temp.) | 60 | 52 |
| F.D. (at 0° F.) | 35 | 30 |
| X.C.P. | 34 | 23 |
| C.O.I. | 105 | 45 |
| P.O.N. | 8.0 | 17.1 |
| O.B.N. | 1.5 | 2.3 |

TABLE 3.—PHYSICAL PROPERTIES AND STRUCTURAL CHARACTERISTICS OF FILMS HEAT-SET AT DIFFERENT TEMPERATURES

| Properties | Heat-Setting Temperature | | |
|---|---|---|---|
| | 150° C. | 160° C. | 170° C. |
| Machine Direction: | | | |
| T.S. | 18,300 | 15,700 | 8,100 |
| El. | 90 | 95 | 26 |
| I.T.M. | 449,000 | 427,000 | 461,000 |
| Tr. S. | 12 | 19 | 57 |
| O.A. | 36 | 30 | 72 |
| Transverse Direction: | | | |
| T.S. | 12,300 | 12,500 | 7,500 |
| El. | 173 | 142 | 11 |
| I.T.M. | 367,000 | 379,000 | 428,000 |
| Tr. S. | 36 | 24 | 76 |
| O.A. | 29 | 28 | 70 |
| Independent of Direction: | | | |
| P.I.S. | 5.75 | 6.7 | 0.9 |
| X.C.P. | 44 | 38 | 8 |
| C.O.I. | 135 | 131 | 10.5 |
| P.O.N. | 12.0 | 12.8 | 4.0 |
| O.B.N. | 7.5 | 4.0 | 1.0 |

*Example V*

The two-way stretched, heat-set polyvinyl chloride film of Example I was immersed into a solution of 1.5% titanium acetyl acetonate in isopropyl alcohol; moved between doctor rolls to remove excess of the solution; and dried. This film was coated on one side with a coating of "Alathon" 16 polyethylene resin[1] applied as a melt at 290° C.

The polyvinyl chloride film having a thin coating of polyethylene applied to one side was heat-sealed to itself (coated side sealed to coated side) at a temperature of 130° C. using a heat-sealing bar of the type described in Example IV using a two second dwell under a pressure of 20 p.s.i. The resulting seal was smooth and free of puckers. The seal strength was entirely adequate for bag making.

*Example VI*

The following polymeric coatings were applied to the two-way stretched, heat-set polyvinyl chloride film of Example I:

Butadiene/acrylonitrile; butadiene/styrene; polyvinyl butyral; polyethylene; dichlorobutadiene (neoprene); polyvinyl chloride and copolymers thereof; polyvinyl acetate and copolymers thereof; alkyl acrylate copolymer; vinylidene chloride copolymers such as copolymer of vinylidene chloride/methyl acrylate/itaconic acid; chloroprene copolymer; styrene copolymer; copolyester of ethylene glycol, terephthalic acid and polyethylene oxide glycol (applied from amyl alcohol). Each of these coatings, except as otherwise designated, was applied from ---
[1] Manufactured by E. I. du Pont de Nemours & Co.

aqueous dispersions of the polymers. The film was dipped into the aqueous dispersion or solvent solution; excess of the coating was wiped off with doctor rods; and the coating was dried at a temperature below 100° C. All of the coated films were heat-sealed (coated side to coated side) at 130° C. using the conditions and sealing bar described in Example IV. All of the seals were smooth and free of puckers, and the apperance of the seals was excellent.

*Example VII*

The polymer composition of Example I containing 92.5 parts polyvinyl chloride resin was extruded and then stretched 2.5× (LD) and 2.5× (TD) in the manner described for Example I.

After the second direction stretching and while still in the tentering apparatus, the film was conducted into a zone where the surrounding air was maintained at 110° C. After 60 seconds in this zone and while still under restraint in the tentering apparatus, the film was led into a second zone wherein the film was heated to a temperature of 160° C. for a period of 3 seconds by a bank of radiant heat lamps mounted above the film. The film was then cooled to room temperature and the tension was released.

The physical properties and structural characteristics of the resulting film are presented in Table 4.

TABLE 4

| Properties | Machine Direction | Transverse Direction |
|---|---|---|
| T.S. | 14,000 | 16,000 |
| El. | 80% | 60% |
| I.T.M. | 440,000 | 455,000 |
| Tr.S. | 12 | 10 |
| Sh. | 15 | 20 |
| | Independent of Direction | |
| P.I.S. | 4.4 | |
| F.D. (at room temp.) | >51 | |
| I.P.V. | 180 | |
| X.C.P. | 28 | |
| C.O.I. | 85 | |
| P.O.N. | 11.2 | |
| O.B.N. | 5.5 | |

*Example VIII*

A composition consisting of 90 parts polyvinyl chloride resin (inherent viscosity of 0.93), 7 parts of a mercapto tin compound and 3 parts of a lubricant was melt extruded at 200° C. in accordance with the procedure described for Example I.

The resulting film was stretched at a temperature of about 90° C. as described in Example I to an extent 3.0× in the longitudinal direction and 2.5× in the transverse direction. The two-way stretched film was then heat treated under tension by exposure to a temperature of 160° C. for 10 seconds and finally cooled under tension to room temperature.

The physical properties and the structural characteristics of the final film, Film A, are compared to those of Film B, a similarly two-way stretched but non-heat treated film in Table 5.

TABLE 5.—PHYSICAL PROPERTIES AND STRUCTURAL CHARACTERISTICS OF FILMS OF EXAMPLE VIII

| Properties | Film A | Film B |
|---|---|---|
| Machine Direction: | | |
| T.S. | 20,100 | 19,200 |
| Sh. | 16 | 45 |
| Transverse Direction: | | |
| T.S. | 9,300 | 9,600 |
| Sh. | 10 | 42 |
| Independent of Direction: | | |
| P.I.S. | 4.5 | 4.6 |
| X.C.P. | 36 | 27 |
| C.O.I. | 116 | 60 |
| P.O.N. | 13.0 | 21.7 |
| O.B.N. | 13.5 | 18.1 |

Examples IX–X

A composition consisting of 94.5 parts polyvinyl chloride resin (inherent viscosity of 0.79), 3.5 parts "Thermolite" 31 and 2 parts "Lubricin" V–3 was melt extruded at 200° C. in accordance with the procedure described for Example I to form film having a thickness of about 6.5 mils.

The resulting film was stretched at a temperature of 80° C. 2.1× in the longitudinal direction and 2.9× in the transverse direction using a procedure essentially identical to that described in Example I. The thickness of the film after this step averaged 1.1–1.2 mils.

In Example IX, the two-way stretched film was heated to 160° C. and maintained under tension at this temperature for 4 seconds. In Example X, the two-way stretched film was heated to 100° C. and maintained under tension at this temperature for 20 minutes. Both films were then cooled substantially to room temperature before the tension was released.

As a control, the polyvinyl chloride composition given above was milled in a rubber mill at 160° C. for 5 minutes. The hot-milled composition was then passed through a three-roll calender. First, the composition passed between two rolls maintained at temperatures of 155° C. and 160° C. respectively; and thereafter, between the 160° C. roll and a third roll at 170° C. The edges of the resulting film were trimmed. The film was then passed for a period of 1 second over a roll heated to a temperature of 240° C.; then over a water-cooled roll where the film was cooled to room temperature; and finally over a roll upon which the film was wound. The final thickness of the film was about 8.5 mils.

The film was then stretched in two directions in the manner described above and in Example I to an average thickness of about 1.2 mils.

In Control IXa, the two-way stretched, calendered film was heated to 160° C. and maintained under tension at this temperature for 4 seconds. In Control Xa, the film was heated to 100° C. and maintained under tension at this temperature for 20 minutes. Both films were then cooled to room temperature before the tension was released.

In the following table, Table 6, the structural characteristics of the melt-extruded films and the calendered films are compared.

TABLE 6

|  | X.C.P. | C.O.I. | P.O.N. | O.B.N. |
| --- | --- | --- | --- | --- |
| Melt-extruded Film: |  |  |  |  |
| As extruded | 0 | 0 | 0.8 | 1.4 |
| After stretch | 19.2 | 48 | 21.4 | 7.0 |
| Example IX | 39.0 | 111 | 13.4 | 3.9 |
| Example X | 42.8 | 138 | 13.4 | 9.4 |
| Calendered Film: |  |  |  |  |
| As calendered | 0 | 0 | 4.1 | 0.7 |
| After stretch | 18.0 | 29 | 15.5 | 2.5 |
| Example IXa | 20.1 | 46 | 12.8 | 2.8 |
| Example Xa | 23.1 | 60 | 11.7 | 2.5 |

Figure 4:
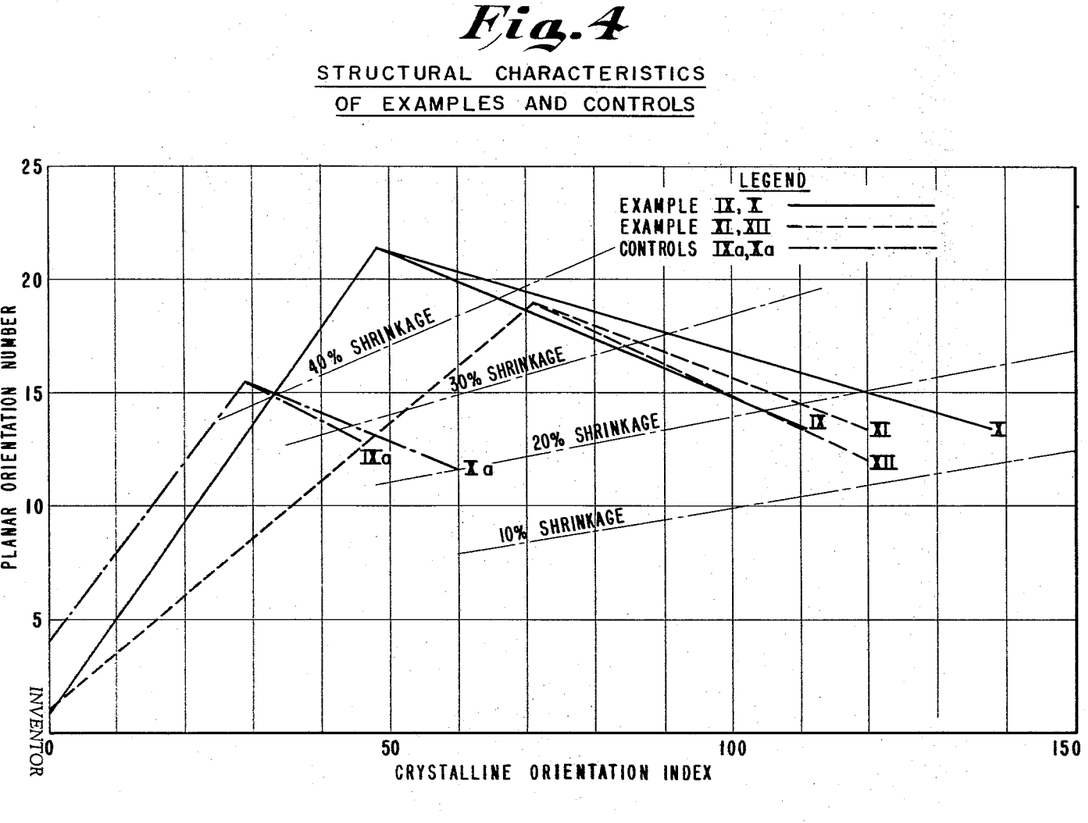
FIGURE 4 is a plot of planar orientation number versus crystalline orientation index for the films of Examples IX, X, XI, XII compared to control films as discussed in those examples.

These results are plotted in FIGURE 4 to illustrate vividly the structural changes that occur during the treatment of the above films.

Examples XI–XII

A composition consisting of 45 parts polyvinyl chloride resin (inherent viscosity of 0.93), 45 parts polyvinyl chloride resin (inherent viscosity of 0.79), 7 parts "Thermolite" 31 and 3 parts "Lubricin" V–3 was melt extruded at 200° C. in accordance with the procedure described for Example I to form film having a thickness of about 6.5 mils.

The resulting film was stretched at a temperature of 80° C. 2.1× in the longitudinal direction and 2.9× in the transverse direction using a procedure essentially identical to that described in Example I. The thickness of the film after this step averaged 1.1–1.2 mils.

In Example XI, the two-way stretched film was heated to 160° C. and maintained under tension at this temperature for 6 seconds. In Example XII, the two-way stretched film was heated to 100° C. and maintained under tension at this temperature for 30 minutes. Both films were then cooled substantially to room temperature before the tension was released.

The structural characteristics of these films are presented in Table 7 and plotted in FIGURE 4.

TABLE 7

|  | X.C.P. | C.O.I. | P.O.N. | O.B.N. |
| --- | --- | --- | --- | --- |
| Film—as extruded | 0 | 0 | 1.0 | 1.1 |
| Film—as stretched | 28.3 | 71 | 18.8 | 7.0 |
| Example XI | 36.7 | 120 | 13.3 | 6.6 |
| Example XII | 38.5 | 120 | 12.0 | 6.5 |

The structural changes which accompany the processes of stretching and heat treating according to the present invention have been illustrated in FIGURE 4. In this figure, the crystalline orientation index is plotted against the planar orientation number for a series of films. The relationship between film structure and dimensional stability is shown by the dashed lines of equal shrinkage. It will be noted that a film might have adequate dimensional stability but if it has not been treated according to the present invention, it will not have a structure characterized by the combination of high crystalline orientation index (greater than 65) and low planar orientation number (less than 16). As shown in the examples, without such a structure, the film displays objectionable temperature sensitivity and tends to be deficient in its durability at room temperature.

Example XIII

A mixture of 97 parts of polyvinyl chloride resin (Dow 111–4 manufactured by the Dow Chemical Co.), 3 parts of beta-pinene [2] and one part per million of zinc as the mercaptide of dodecanethiol, having a glass transition temperature of 100° C., was extruded at a temperature of 205° C. to form a film following the procedure described in Example I.

The resulting film was stretched 2× in the longitudinal and transverse directions at a temperature of about 102°–105° C. It was then heat-set at a temperature of 150° C. while the stretched dimensions of the film were maintained constant for two minutes.

The resulting film was clear. The physical properties and structural characteristics of the film were the same as those shown for the film made under Example I.

Example XIV

This example serves to bring out the importance of using no more than the equivalent of 10% plasticizer, preferably less than 5% plasticizer, in the extrusion of polyvinyl chloride film. It also serves to show that a certain minimum amount of stretching in two directions, an increase in area factor of about at least 2.9, is required before any significant improvement is obtained in durability, particularly at low temperature, as measured by the falling ball impact test.

A mixture of 92 parts of polyvinyl chloride (Dow 111–4, manufactured by Dow Chemical Co.), 4 parts of beta-pinene [3] and 4 parts of dodecanethiol [3] was extruded at a temperature of 180° C. from a 6-inch flat die on a one-inch diameter extruder to form a film 10 mils in thickness. The film was then stretched simultaneously in the longitudinal and transverse directions at a temperature of 92° C. and at an elongated rate of 500% per minute. The film was then heat-set at a temperature of 150° C.

---

[2] Having the plasticizing effect of about 1.5 parts of a primary plasticizer.
[3] Each having the plasticizing effect of about 2 parts of a primary plasticizer.

while the stretched dimensions were maintained constant for two minutes.

Following the same procedure, a second film (Control A) was made from a mixture of 82 parts of polyvinyl chloride, and additives having the effect of approximately 14 parts of a primary plasticizer; namely, 4 parts of beta-pinene, 4 parts of dodecanethiol and 10 parts of "Santicizer B-16" (butyl-phthallyl butyl glycolate, manufactured by Monsanto Chemical Co.). A third film (Control B) was made using the same procedure from a mixture of 65 parts of polyvinyl chloride and additives having the effect of approximately 31 parts of a primary plasticizer; namely, 4 parts of beta-pinene, 4 parts of dodecanethiol and 27 parts of "Santicizer B-16." The physical properties of the several films are shown below.

It was found that film Control A could not be stretched more than 2× in each direction without rupturing the film. A similar result was obtained with a film made from a mixture of 84 parts of polyvinyl chloride, 4 parts of beta-pinene, 4 parts of dodecanethiol and 8 parts of "Santicizer B-16," i.e. additives equivalent to about 12 parts of a primary plasticizer.

film, the usual procedure is to immerse the film-enclosed meat in a liquid at about 100° C. for a short period. For this reason, the shrinkage values in the table were obtained by immersing the film for one second in water at 100° C. To convert these shrinkage values to values obtained by exposure to air at 130° C. for 10 minutes, the 100° C. water shrinkage value is multipled by a factor of approximately 1.25.

TABLE 9.—PHYSICAL PROPERTIES AND STRUCTURAL CHARACTERISTICS OF FILMS OF EXAMPLES XV-XIX

| Example | Stretch, LD[1]/TD[2] | Sh. (percent) (100° C./1 sec.) LD/TD | T.S. (p.s.i.), LD/TD | P.I.S. (kg.-cm./mil) | X.C.P. | C.O.I. | P.O.N. | O.B.N. |
|---|---|---|---|---|---|---|---|---|
| XV | 2.0 x 2.5 | 26/34 | 15,400/16,100 | 4.3 | 19 | 44 | 17.3 | 1.7 |
| XVI | 2.0 x 1.7 | 28/28 | 14,800/12,200 | 4.0 | 19 | 35 | 19.2 | 12.8 |
| XVII | 2.5 x 3.0 | 34/40 | 16,400/16,400 | 3.8 | 30 | 88 | 17.1 | 1.1 |
| XVIII | 3.0 x 3.0 | 34/42 | 20,800/13,900 | 4.9 | 32 | 94 | 22.8 | 8.8 |
| XIX | 2.0 x 3.0 | 22/30 | 15,100/16,500 | 4.9 | 36 | 111 | 16.0 | 8.5 |

[1] Machine or longitudinal direction.  [2] Transverse direction.

TABLE 8

| Properties | Films | | |
|---|---|---|---|
| | Ex. XIV | Control A | Control B |
| Stretch Ratio—1.5 x 1.5, Tenacity (p.s.i.): | | | |
| MD | 8,800 | 6,200 | 7,500 |
| TD | 7,900 | 5,700 | 4,200 |
| Elongation, percent: | | | |
| MD | 178 | 298 | 284 |
| TD | 197 | 346 | 262 |
| Modulus (p.s.i.): | | | |
| MD | 363,000 | 122,000 | 4,100 |
| TD | 317,000 | 156,000 | 2,700 |
| Falling Ball Impact Strength, 0° F. (kg.-cm./mil) | 2.7 | 0.9 | 0.5 |
| Stretch Ratio—2.0 x 2.0, Tenacity (p.s.i.): | | | |
| MD | 11,300 | 7,600 | 3,400 |
| TD | 10,600 | 5,200 | 3,200 |
| Elongation, percent: | | | |
| MD | 109 | 227 | 326 |
| TD | 120 | 285 | 312 |
| Modulus (p.s.i.): | | | |
| MD | 380,000 | 123,000 | 1,800 |
| TD | 332,000 | 173,000 | 1,500 |
| Falling Ball Impact Strength, 0° F. (kg.-cm./mil) | 48 | 1.5 | 1.0 |
| Stretch Ratio—2.3 x 2.3, Tenacity (p.s.i.): | | | |
| MD | 14,600 | [1] | 3,800 |
| TD | 10,200 | [1] | 3,900 |
| Elongation, percent: | | | |
| MD | 96 | [1] | 319 |
| TD | 103 | [1] | 330 |
| Modulus (p.s.i.): | | | |
| MD | 432,000 | [1] | 2,000 |
| TD | 355,000 | [1] | 1,700 |
| Falling Ball Impact Strength, 0° F. (kg.-cm./mil) | 27.7 | [1] | 2.6 |

[1] Film broke.

*Examples XV–XIX*

The films of these examples were prepared by a method essentially identical to that of Film C of Example I. The stretch ratios varied from sample to sample as shown in Table 9. The properties and structural characteristics of these films are also given in Table 9.

In wrapping meats and the like with the heat-shrinkable

*Example XX*

A polyvinyl chloride composition consisting of 90 parts polyvinyl chloride resin (inherent viscosity 0.93), 7 parts of mercapto tin stabilizer and 3 parts of a lubricant was continuously extruded and oriented in a tubular extrusion apparatus similar to that described in copending application Serial No. 665,053. Molten polymer, at a temperature of about 190° C., was extruded at the rate of 13 pounds per hour from a one-inch extruder equipped with a two-inch circular die having an opening between the die lips (between the boundaries of the annular area) of 63 mils. The tubular film was extruded downwardly in a vertical direction.

The apparatus was so arranged that the tubing was cooled immediately after extrusion to a temperature of about 90° C. without change in its dimensions by passage through a restraining gas-pervious cylindrical section and thereafter was expanded to 2.6 times its original diameter under an applied internal air pressure to an internal diameter of 5.2 inches and a wall thickness of 1.2 mils. The thus-oriented tubular film was allowed to cool, without further dimensional change, in the surrounding air. A pair of pinch rolls, operating at a speed of 13 feet per minute, was employed to advance the tubular film from the die and collapse the tubing for windup.

The physical properties and structural characteristic of the resulting polyvinyl chloride film are given in Table 10.

TABLE 10

| | Direction | |
|---|---|---|
| | Transverse | Machine |
| Tensile strength (10³ p.s.i.) | 15.0 | 9.4 |
| Elongation (percent) | 67 | 135 |
| Initial tensile modulus (10³ p.s.i.) | 425 | 330 |
| Tear strength (g./mil) | 15 | 35 |
| Shrinkage (100° C. water—1 second) | 32 | 24 |
| Pneumatic impact strength (kg.-cm./mil) | 3.5 | |
| Bag drop durability (room temp.) | 25 | |
| Planar orientation number | 17.9 | |
| Orientation balance number | 19.2 | |
| Crystalline orientation index | 36 | |

Examination of the physical properties and structural data for the polyvinyl chloride film shows that molecular orientation effected by the process of this example is in two mutually perpendicular directions with the greater orientation being in a direction transverse to the longitudinal axis of the tubing. This is shown by the relatively high imbalance in tensile strength and reflected structurally by the relatively large orientation balance number. The degree of planar orientation obtained is reflected in the pneumatic impact strength and satisfactory bag drop durability.

Example XXI

The following example demonstrates the special importance of the present invention. It shows that even when these films have been shrunken by exposure to high temperatures, they retain a substantial fraction of their initial good properties. For example, after shrinkage they still provide adequate durability in the final container.

A polyvinyl chloride film was prepared essentially as described in Example I, except that the stretch ratios in the longitudinal and transverse directions were 2.4 and 2.9, respectively. A portion of this stretched film was allowed to shrink unrestrained during exposure to boiling water at 100° C. for 1 second. The properties of the initial extruded but unstretched film, the stretched film and the shrunken film are given in the following table, Table 11.

As controls, the same polyvinyl chloride composition was milled in a rubber mill at 160° C. for 5 minutes. The hot-milled composition was then passed through a three-roll calender. First, the composition passed between two rolls maintained at temperatures of 155° C. and 160° C., respectively; and, thereafter, between the 160° C. roll and a third roll at 170° C. The edges of the resulting film were trimmed. The film was then passed for a period of 1 second over a roll heated to a temperature of 240° C.; then over a water-cooled roll where the film was cooled to room temperature; and finally over a roll upon which the film was wound. The calendered film was then stretched 2.4× and 2.9× in the two mutually perpendicular directions. The stretched film was then allowed to shrink in boiling water at 100° C. for 1 second. The properties of the controls are also given in Table 11.

TABLE 11.—PHYSICAL PROPERTIES AND STRUCTURAL CHARACTERISTICS OF MELT EXTRUDED FILM OF EXAMPLE XXI AND CALENDERED FILM OF CONTROL

|  | As-Cast | Stretched | After Shrinking |
|---|---|---|---|
| Melt Extruded Film: |  |  |  |
| P.I.S. | 0.3 | 5.4 | 4.4 |
| F.D. (at room temp.) | 4.0 | 95 | 65 |
| Sh. (100° C. water/1 sec.) | 3.0 | 35.2 | 1.5 |
| T.S.: |  |  |  |
| LD | 8,300 | 17,600 | 11,200 |
| TD | 7,000 | 23,000 | 12,400 |
| El.: |  |  |  |
| LD | 190 | 110 | 200 |
| TD | 60 | 66 | 175 |
| I.T.M.: |  |  |  |
| LD | 390,000 | 377,000 | 314,000 |
| TD | 380,000 | 488,000 | 328,000 |
| X.C.P. | 0 | 40 |  |
| C.O.I. | 0 | 72 |  |
| P.O.N. | 1.5 | 19.8 |  |
| O.B.N. | 0.5 | 5.2 |  |
| Calendered Film: |  |  |  |
| P.I.S. | 3.1 | 4.1 | 3.0 |
| F.D. (at room temp.) | 7 | 42 | 6 |
| Sh. (100° C. water/1 sec.) | 2.5 | 61 | 2.5 |
| T.S.: |  |  |  |
| LD | 8,200 | 20,500 | 8,800 |
| TD | 6,300 | 17,500 | 10,400 |
| El.: |  |  |  |
| LD | 244 | 61 | 171 |
| TD | 113 | 62 | 154 |
| I.T.M.: |  |  |  |
| LD | 342,000 | 433,000 | 274,000 |
| TD | 343,000 | 394,000 | 287,000 |
| X.C.P. | 0 | 17.7 |  |
| C.O.I. | 0 | 28 |  |
| P.O.N. | 3.5 | 15.0 |  |
| O.B.N. | 2.0 | 3.0 |  |

The control stretched calendered film had an X-ray crystallinity parameter of only 17.7 and a crystalline orientation index of only 28, in contrast to the values of 40 and 72, respectively, for the corresponding stretched extruded film. The superior retention of properties, particularly impact strength and durability, upon unrestrained shrinkage for the film from the extrusion route is believed due to the high crystalline orientation index and high crystallinity of this film prior to shrinkage, and the resulting partial retention of orientation in the shrunken film. During the unrestrained shrinkage at 100° C. the extruded film underwent an average shrinkage of 35.2% in the longitudinal direction and transverse direction, while the stretched calendered film underwent an average shrinkage of 61% in the two directions. The high shrinkage of the calendered film probably results from the relatively lower proportion of crystalline orientation and higher proportion of amorphous orientation in the calendered film after stretching.

It will be noted that there is a distinct threshold in the relationship between pneumatic impact strength and the bag drop durability of thin films. With polyvinyl chloride, it is found that essentially no improvement in bag drop durability upon increasing pneumatic impact strength is realized until a value for pneumatic impact strength of about 3.5 kg.-cm./mil is reached. Above this value, the bag drop durability is suddenly and markedly improved. It may be seen from the data that even when stretched to the highest degree, the oriented calendered films fall well below this critical threshold value of 3.5 kg.-cm./mil after shrinkage.

Surprisingly, it has been found that only by starting with a melt-extruded film of polyvinyl chloride is it possible to obtain the required structure of the present invention. Further, it is necessary that the stretched film be especially highly oriented, having a planar orientation number in excess of 16 and a crystalline orientation index of at least 35. For reasons which are at present not completely understood, it is impossible to obtain this structure by methods which involve calendering films of polyvinyl chloride. Stretching these films even to an exceptionally high degree does not provide the desired structure.

THEORETICAL CONSIDERATIONS

The importance of the structural characteristics of the film of the present invention may be explained by the following theoretical considerations. However, it is not intended that the scope of the invention be limited in any way by the following discussion.

The film produced by melt extrusion appears initially substantially amorphous by X-ray measurements. Stretching this film according to the preferred method of the invention results in a marked increase in the total orientation of the film. This increase is expressed quantitatively in terms of the increase of the planar orientation number. It is found that the general improvement in the room temperature physical properties of the film upon stretching is relatable to the value of the planar orientation number of said film. The planar orientation number reflects the total orientation of the film including the orientation of both the crystalline and the amorphous material within the polymer structure. Although much of the orientation initially obtained is in amorphous regions, X-ray measurements indicate that there is some increase in the crystallinity during stretching and that considerable crystalline orientation results as reflected in the increase in the crystalline orientation index. This is concluded from the appearance of new, relatively sharp diffraction rings due to the crystallized material showing marked orientation effects accompanying the process of crystallization.

Thus, with the vinyl chloride polymer, it has been found that there is a close relationship between the amount of crystalline material and the orientation of this crystalline material. This finding is in contrast to the behavior of other polymeric materials in which significant crystallinity may be obtained by suitably annealing the unoriented structures. Because of this relationship, the behavior of polyvinyl chloride differs from other initially amorphous polymeric materials such as polystyrene or polyvinyl acetate. Oriented polyvinyl chloride films can be made form-stable by the known techniques of heat-setting while oriented films of polystyrene and polyvinyl acetate cannot. Attempts to heat-set these latter films after they have been oriented, results only in a loss of the orientation and a loss of the associated beneficial effects on properties imparted during stretching and/or rolling of the film structure.

Furthermore, in the case of polyvinyl chloride, it has been found that as the orientation and amount of crystallinity increase, the line width or sharpness of the crystalline rings shows a corresponding change, the lines becoming noticeably sharper as the crystalline orientation increases. It is known that the width of a diffraction ring depends on the size and/or the perfection of the crystallites. Hence, it is thought that larger, more perfect crystallites result from increased orientation. An even more pronounced effect results from the heat treatment step. This step results in a higher effective melting point range for the crystallites due to their increased perfection. It is felt that this effect may contribute in no small part to the dimensional stability of the final structures of the invention.

There is another factor that it is believed contributes to the improvement in dimensional stability of the film. It has been found that the shrinkage tendency of the film at temperatures within the range of about 70° to about 150° C. is largely due to the amorphous orientation of the film. Only at temperatures above about 150° C. and more particularly above 170° C. does any additional shrinkage tendency due to the orientation of the crystalline material become evident. It is believed that the heat treatment of the film under tension within the specified temperature range tends to reduce the shrinkage and at the same time permits the film to retain its orientation-dependent properties. The heat treatment seems to be accompanied by a structural transformation involving additional conversion of a large portion of the amorphous orientation into crystalline orientation as reflected by the increase in crystalline orientation index. This process is apparently not completely efficient, however, so that some of the original orientation may be lost during the process, depending on the processing conditions. Thus, it is found that the final heat treated films of this invention invariably show a decreased value of the planar orientation number over the corresponding stretched films and that this value may be correlated with the shrinkage tendency of the film at a particular temperature. Most of the ultimate shrinkage will occur only at temperatures in excess of about 150°–170° C., corresponding to the onset of crystalline melting and the relaxation of stress in the melted portions through shrinkage of the unrestrained film.

The novel film of this invention finds its greatest utility in the field of food packaging where its sparkling clarity acts as a strong attraction to the consumer. Its outstanding durability, particularly remarkable in view of the brittle nature of lightly plasticized polyvinyl chloride films heretofore known, minimizes the handling and storage problems. The relatively low temperature sensitivity of its properties make it uniquely suited for use at the low temperatures encountered in freezer and cold storage applications. Its combination of high durability, high stiffness for good machine operability, and, when heat-set, good high temperature dimensional stability make it an excellent base for heat-sealable coatings of polyethylene, nitrocellulose and the like, thus facilitating conversion to bags, containers, etc., on standard packaging machinery. The relatively low moisture vapor permeability enhances the utility of the film in the field of food packaging and also provides additional uses such as wrapping hardware items, greased or untreated machine parts and similar materials which must be kept free from moisture. Sheets or tubes of the film may be used in bundling applications to hold together several packages of cigarettes, crackers, small boxes of cereals, etc. In sheet form, the film also makes an excellent tape for use as an adhesive tape, sound recording tape, etc., or as the base for the ingredients of motion picture film. These latter uses are attributed to the form-stability of the film, its high tensile strength and low elongation in the longitudinal direction and its excellent surface properties which facilitate the application of uniform coatings. The essential lack of plasticizing additives and the insensitivity of the film to moisture provides excellent shelf life for the film and also provides that the film may be reusable in certain applications.

As many widely different embodiments may be made without departing from the spirit and scope of this invention, it is understood that the invention is not limited except as defined in the appended claims.

Having fully disclosed the invention, what is claimed is:

1. A process of preparing polyvinyl chloride film which comprises the steps in sequence of extruding a melt containing polyvinyl chloride resin and additives comprising a heat-stabilizing agent at least one of said additives having plasticizing properties, the total amount of additives being such as to produce an effect no greater than that produced by 1.5 to 10% of a primary plasticizer for said resin to form a film; elongating said film in at least one direction an amount necessary to increase the planar orientation number of said film to at least 16 while holding said film at a temperature of 80–115° C.; and, thereafter, cooling said film to a temperature below 70° C. while imposing tension on said film to prevent any substantial change in the film's dimensions; and, thereafter, releasing said tension.

2. A process as in claim 1 wherein elongation of the film is effected by rolling said film under pressure.

3. A process as in claim 1 wherein elongation is effected by stretching said film at least 1.7 times its original dimension in at least one direction.

4. A process as in claim 1 wherein elongation is effected at a temperature of 80–95° C.

5. A process as in claim 1 wherein said film after extrusion is elongated by stretching in two mutually perpendicular directions amounts to increase the area of said film by a factor of 2.9.

6. A process of preparing polyvinyl chloride film which comprises the steps in sequence of extruding a melt containing polyvinyl chloride resin and additives comprising a heat-stabilizing agent, at least one of said additives having plasticizing properties, the total amount of additives being such as to produce an effect no greater than that produced by 1.5 to 5% of a primary plasticizer for said resin to form a film; elongating said film 1.7–3 times its original dimensions in two mutually perpendicular directions while holding said film at a temperature of 80–95° C.; permitting said film to cool to a temperature of 70° C. while imposing tension on said film to prevent any substantial change in the film's dimension; and, thereafter, releasing said tension.

7. A process of preparing polyvinyl chloride film which comprises the steps in sequence of extruding a melt containing polyvinyl chloride resin and additives comprising a heat-stabilizing agent, at least one of said additives having plasticizing properties, the total amount of additives being such as to produce an effect produced by 1.5 to 10% of a primary plasticizer for said resin to form a film; elongating said film in at least one direction an amount necessary to increase the planar orientation number of said film to at least 16 while holding said film at a temperature of 80–115° C.; maintaining the temperature of said film at a temperature of 100–165° C. while preventing any substantial change in the film's dimensions for a time sufficient to reduce the planar orientation number of said film to less than 16 and to provide a crystalline orientation index for said film of at least 65; and, thereafter, cooling said film to a temperature of 80–100° C. while still preventing any substantial change in the film's dimensions; and permitting said film to cool to room temperature.

8. A process as in claim 7 wherein elongation of the film is effected by rolling said film under pressure.

9. A process as in claim 7 wherein elongation is effected by stretching said film at least 1.7 times its original dimension in at least one direction.

10. A process as in claim 7 wherein elongation is effected while holding said film at a temperature of 80–95° C.

11. A process as in claim 7 wherein the temperature of said film is maintained at 150–165° C. while preventing any substantial change in the film's dimensions.

12. A process as in claim 7 wherein said film after extrusion is elongated by stretching in two mutually perpendicular directions amounts to increase the area of said film by a factor of at least 2.9.

13. A process of preparing polyvinyl chloride film which comprises the steps in sequence of extruding a melt containing polyvinyl chloride resin and additives comprising a heat-stabilizing agent and a lubricant, at least one of said additives having plasticizing properties, the total amount of additives being such as to produce an effect produced by 1.5 to 5% of a primary plasticizer for said resin to form a film; elongating said film 1.7–3 times its original dimensions in two mutually perpendicular directions while holding said film at a temperature of 80–95° C.; raising the temperature of said film to 150–165° C. while preventing any substantial change in the film's dimensions; and permitting said film to cool to 80–100° C. while still preventing any substantial change in the film's dimensions; and permitting said film to cool to room temperature.

14. A process of preparing polyvinyl chloride film which comprises the steps in sequence of extruding a melt containing polyvinyl chloride resin and additives, said additives comprising at least one heat-stabilizing agent, at least one of said additives having plasticizing properties, the total amount of addivtives being such as to produce a plasticizing effect produced by 1.5 to 10% of a primary plasticizer for said resin to form a film; elongating said film in at least one direction at a temperature of 80–115° C. at least 1.7 times its original dimension, the total amount of stretch being an amount to increase the area of said film by a factor of at least 2.9; maintaining the temperature of said film at a temperature of 100–165° C. while preventing any substantial change in the film's dimensions; and permitting said film to cool to 80–100° C. while still preventing any substantial change in the film's dimensions.

15. A process of preparing polyvinyl chloride film which comprises blending a mixture of polyvinyl chloride resin and additives comprising a heat-stabilizing agent, at least one of said additives having plasticizing properties, the total amount of additives being such as to produce an effect produced by 1.5 to 10% of a primary plasticizer for said resin; and the steps in sequence of heating said mixture to a temperature above the melting point of the polyvinyl chloride resin sufficient to convert the mixture into a melt containing the polyvinyl chloride resin and a sufficient amount of said heat-stabilizing agent to prevent degradation of said polyvinyl chloride; extruding the melt in the form of a film while retaining a sufficient amount of said heat-stabilizing agent in said melt to prevent degradation of said polyvinyl chloride; elongating said film in at least one direction at least 1.7 times its original dimension in that direction while holding said film at a temperature of 80–115° C.; and, thereafter, cooling said film to a temperature below 70° C. while imposing tension on said film to prevent any substantial change in the film's dimensions; and, thereafter, releasing said tension.

16. A process of preparing polyvinyl chloride film which comprises blending a mixture of polyvinyl chloride resin and additives comprising a heat-stabilizing agent, at least one of said additives having plasticizing properties, the total amount of additives being such as to produce an effect produced by 1.5 to 10% of a primary plasticizer for said resin; and the steps in sequence of heating said mixture to a temperature above the melting point of the polyvinyl chloride resin sufficient to convert the mixture into a melt containing the polyvinyl chloride resin and a sufficient amount of said heat-stabilizing agent to prevent degradation of said polyvinyl chloride; extruding the melt in the form of a film while retaining a sufficient amount of said heat-stabilizing agent in said melt to prevent degradation of said polyvinyl chloride; elongating said film by stretching said film in two mutually perpendicular directions amounts to increase the area of said film by a factor of at least 2.9 while holding said film at a tempearture of 80–115° C.; and, thereafter, cooling said film to a temperature below 70° C. while imposing tension on said film to prevent any substantial change in the film's dimensions; and, thereafter, releasing said tension.

17. A process of preparing polyvinyl chloride film which comprises blending a mixture of polyvinyl chloride resin and additives comprising a heat-stabilizing agent, at least one of said additives having plasticizing properties, the total amount of additives being such as to produce an effect produced by 1.5 to 10% of a primary plasticizer for said resin; and the steps in sequence of heating said mixture to a temperature above the melting point of the polyvinyl chloride resin sufficient to convert the mixture into a melt containing the polyvinyl chloride resin and a sufficient amount of said heat-stabilizing agent to prevent degradation of said polyvinyl chloride; extruding the melt in the form of a film while retaining a sufficient amount of said heat-stabilizing agent in said melt to prevent degradation of said polyvinyl chloride; elongating said film in at least one direction at least 1.7 times its original dimension in that direction while holding said film at a temperature of 80–115° C.; maintaining the temperature of said film at a temperature of 100–165° C. while preventing any substantial change in the film's dimensions for a time sufficient to heat-set the film; and, thereafter, cooling said film to a temperature of 80–100° C. while still preventing any substantial change in the film's dimensions; and permitting said film to cool to room temperature.

18. A process of preparing polyvinyl chloride film which comprises blending a mixture of polyvinyl chloride resin and additives comprising a heat-stabilizing agent, at least one of said additives having plasticizing properties, the total amount of additives being such as to produce an effect produced by 1.5 to 10% of a primary plasticizer for said resin; and the steps in sequence of heating said mixture to a temperature above the melting point of the polyvinyl chloride resin sufficient to convert the mixture into a melt containing the polyvinyl chloride resin and a sufficient amount of said heat-stabilizing agent to prevent degradation of said polyvinyl chloride; extruding the melt in the form of a film while retaining a sufficient amount of said heat-stabilizing agent in said melt to prevent degradation of said polyvinyl chloride; elongating said film by stretching said film in two mutually perpendicular directions amounts to increase the area of said film by a factor of at least 2.9 while holding said film at a temperature of 80–115° C.; maintaining the temperature of said film at a temperature of 100–165° C. while preventing any substantial change in the film's dimensions for a time sufficient to heat-set the film; and, thereafter, cooling said film to a temperature of 80–100° C. while still preventing any substantial change in the film's dimensions; and permitting said film to cool to room temperature.

References Cited by the Examiner

UNITED STATES PATENTS

| | | | |
|---|---|---|---|
| 2,851,733 | 9/1958 | Pagonis et al. | 18—48 |
| 2,952,867 | 9/1960 | Diedrich et al. | 18—48 XR |

ALEXANDER H. BRODMERKEL, *Primary Examiner.*

MORRIS LIEBMAN, *Examiner.*